United States Patent Office 3,294,764
Patented Dec. 27, 1966

3,294,764
HIGH POLYMERS OF TRIBUTYLVINYL-PHOSPHONIUM HALIDES
Joseph Jacinto Pellon, New Canaan, Martin Grayson, Norwalk, and Kent John Valan, Stamford, Conn., assignors to American Cyanamid Company, Stamford, Conn., a corporation of Maine
No Drawing. Filed July 30, 1963, Ser. No. 298,551
12 Claims. (Cl. 260—80)

This invention relates to a novel group of polymeric compositions. More particularly, this invention relates to a novel group of polymeric compositions prepared from phosphorus-containing monomers. Still more particularly, this invention relates to a novel group of high molecular weight polymers prepared from monomers represented by the structural formula (I)     $(CH_3CH_2CH_2CH_2)_3—P^{\oplus}—CH=CH_2 \cdot X^{\ominus}$ wherein X is a chlorine, bromine, fluorine or iodine radical.

Prior art attempts at the free radical polymerization of monomers having a vinyl group connected directly to a phosphorus atom have not resulted in the production of high molecular weight polymers. While various vinyl phosphonate esters have resulted in oligomers of molecular weight less than 5000, Pike et al., J. Polymer Sci., volume 44, page 531, 1960, poor results have been reported for diphenylvinylphosphine, Paisley et al., J. Polymer Sci., volume 56, page 533, 1962, diphenylvinylphosphine oxide, Berlin et al., note, J. Org. Chem., volume 26, page 3527, 1961 and diphenylvinylphosphine sulfide, Berlin, Chem. & Ind., volume 1962, page 2537, 1962. Nothing has been reported regarding the polymerization of vinyl phosphonium compounds. In view of this general behavior of vinyl-phosphorus monomers, with phosphorus both in the trivalent and pentavalent state, it was indeed surprising that tributylvinylphosphonium chloride, bromide, fluoride and iodide could be polymerized to polymers having very high molecular weights, i.e. over 50,000. This was even more unexpected since related vinyl ammonium and sulfonium compounds are not considered to be polymerizable, Duling, Dissertation, University of Pennsylvania, 1961.

It is therefore an object of the present invention to present a novel group of polymers.

It is a further object of the instant invention to present a novel group of polymer compositions prepared from phosphorus-containing monomers.

It is still a further object of the instant invention to present a novel group of high molecular weight polymers prepared from monomers represented by Formula I.

These and other objects will become more apparent to those skilled in the art upon reading the more detailed description set forth hereinbelow.

The homopolymers

The novel polymers of the present invention, as set forth above, are produced from monomers represented by Formula I. Compounds which are included in said formula, and therefore are within the scope of the instant invention, are tributylvinylphosphonium bromide, tributylvinylphosphonium chloride, tributylvinylphosphonium fluoride and tributylvinylphosphonium iodide.

A method for the production of these monomers is set forth in copending application, Serial No. 256,125, filed February 4, 1963, and now abandoned, to Phosphonium Salts and Derivatives, by Rauhut et al.

The homopolymers which form the subject of the present invention are composed of recurring units of the structural formula (II)
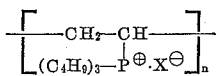

wherein $n$ is the number of recurring units, $n$ usually being greater than 100.

The polymers of the present invention have molecular weights varying over a fairly wide range. For instance, the polymers may have molecular weights ranging from about 50,000 to an excess of about 1,000,000. The molecular weight of the polymers is a weight average molecular weight as determined by the light scattering method, P. J. Flory, Principles of Polymer Chemistry, Cornell University Press, pages 256–316, 1953. They are white, powdery solids which are soluble in water, and various polar solvents such as alcohols, ketones, dimethylformamide, acetonitrile and methanol. At room temperature they are elastomeric, being somewhat tacky and flexible. They have glass transition temperatures below room temperature and soften gradually on heating so that they are fluid at around 100° C.

The copolymers

The copolymers which also form part of the instant invention are white powdery, high molecular weight solids which can be prepared from any of the monomers represented by Formula I, above, and various comonomers, in amounts ranging from about 0.5% to about 95% of the vinyl phosphonium halide and correspondingly about 5.0% to about 99.5% of the copolymerizable comonomer.

Examples of monomers which can be copolymerized with the monomers represented by Formula I, and which can be polymerized either singly or in a plurality (two, three, four or any desired number), the latter often being desirable in order to improve the compatability and copolymerization characteristics of the mixture of monomers and to obtain copolymers having the particular properties desired for the particular service application, are such monomers as the unsaturated alcohol esters, more particularly, the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such as, for instance, an acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alphamethyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allkyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the monomers of Formula I are the vinyl halides, more particularly vinyl fluoride, vinyl chloride, vinyl bromide, and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

Among the comonomers which are preferred for use in carrying our invention into effect are, for example, compounds such as acrylonitrile, and other compounds, e.g., the various substituted acrylonitriles (e.g., methacrylonitrile, ethacrylonitrile, phenylacrylonitrile, etc), the various N-substituted acrylamides and alkacrylamides, for instance, N-dialkyl acrylamides and methacrylamides, e.g., N-dimethyl, -diethyl, -dipropyl, dibutyl, etc., acrylamides and methacrylamides and the alkyl acrylates and methacrylates such as those having the formula (III) 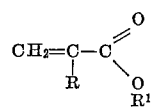

where R is a hydrogen or methyl radical and R' is a hydrogen or an alkyl radical having from 1 to 6 carbon atoms, inclusive. Examples of monomers represented by Formula III include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and their corresponding alkyl methacrylates.

Of course, it is also possible to utilize copolymers produced from two or more of the monomers represented by Formula I, above, and still obtain the benefits heretofore set forth.

The homopolymers and copolymers of the present invention generally have uses similar to those of conventional vinyl polymers. That is, they may be used to form fibers, foils, filaments, adhesives, water-soluble films, coatings, and the like or they may be used as thickening agents, ion exchange resins and the like.

The polymers may be used as produced or may be modified by the addition of such materials as plasticizers, dyes, pigments, fillers, stabilizers, and the like without detracting from their advantageous physical and chemical properties and characteristics.

The novel homopolymers and copolymers of the present invention may be produced by any known method. For example, the polymers may be produced by subjecting aqueous solutions of the polymerizable monomer or monomers to radiation polymerization at temperatures ranging from ambient to 100° C., utilizing dosage ranges of 0.5–4.0 mrads. at dose rates of from about 0.5 mrad./hr. to about 4 mrad/hr. The polymerization generally is conducted in an inert atmosphere. That is to say, the reaction is conducted in the presence of an inert gas such as nitrogen, argon, neon and the like.

Another method which may be used to produce our novel polymers comprises conducting the polymerization in the presence of a free radical-generating catalyst such as azobisisobutyronitrile, ditertiarybutyl peroxide, benzoyl peroxide, potassium persulfate and the like. It is noted however, that depending upon the oxidizability of the halide involved, i.e., I>Br>Cl>F it may be necessary to select a catalyst which is less oxidizing, e.g. an azo compound. Catalysts concentrations ranging from about 0.005% to about 1.0%, by weight, based on the weight of the polymerizable monomers, may be used.

The temperature employed depends upon the catalysts used, for example, when azobisisobutyronitrile is employed, temperatures ranging from about 40° C. to about 90° C. are satisfactory, while temperatures ranging from about 100° C. to about 150° C. may be used for ditertiarybutyl peroxide. The temperatures at which these catalysts are effective are well known in the art. The polymerization is preferably conducted at atmospheric pressures, although subatmospheric and superatmospheric pressures may be utilized, if necessary or desirable, in the presence of an inert atmosphere such as nitrogen gas, neon, argon, etc. and in the presence of solvents such as water, chlorobenzene, benzene, acetontrile, dimethylformamide and the like.

It is stressed that the above-enumerated procedures are generally well known in the art and therefore, as such, form no part of the present invention.

The following examples are set forth for purposes of illustration only and are not to be construed as limitations on the present invention except as set forth in the appended claims. All parts and percentages are by weight unless otherwise specified.

*Example 1*

Into a suitable reaction vessel is charged a 30% aqueous solution containing 22.5 parts of tributylvinylphosphonium bromide and 75 parts of distilled water. Nitrogen gas is bubbled through the solution for 15 minutes after which the vessel is sealed air tight. The deaerated solution is then contacted with X-rays (250 kilovolt peak X-rays at 30 milliamps) and irradiated at ambient temperatures for 4.5 hours at a distance of 10 centimeters. The calculated dose to which the solution is subjected is 1.9 mrad. After a 3 week dialysis period, 21.5 parts (95%) of homopolymeric tributylvinylphosphonium bromide is recovered.

Ten parts of this polymer are then further purified by adding 500 parts of methyl ethyl ketone. A gummy solid separates and the methyl ethyl ketone is decanted off. The gummy solid is then triturated with a 50/50 mixture of methyl ethyl ketone and diethyl ether. The solid is then rinsed twice with more ether and a white, somewhat tacky, solid is recovered. The solid is dried for two hours at 50° C. in a vacuum oven, dissolved in water and freeze dried. The resultant product is a fluffy, white solid which is slightly hygroscopic. The yield is 60%. The intrinsic viscosity of the polymer in methanol, which is 0.3 M in sodium formate, is 0.77. The molecular weight of the polymer, by light scattering method in methanol, 0.3 M in sodium formate, is 600,000.

Analysis.—Found: C, 52.72; H, 9.32; P, 9.52; Br, 26.06. Theory: C, 54.40; H, 9.70; P, 10.00; Br, 25.90.

*Example 2*

Following the irradiation technique set forth in Example 1 above, 100 parts of a solution consisting of 15.5 parts of tributylvinylphosphonium bromide, 2.65 parts of acrylonitrile and 164 parts of water are subjected to an irradiation dose calculated to be 0.86 mrad. The resultant slurry is filtered and the solids are washed with water followed by alcohol and dried overnight at 50° C. in a vacuum oven. Analysis indicates the product is a copolymer containing 20 to 24 weight percent of the phosphonium compound. The intrinsic viscosity in dimethyl formamide, which is 0.3 M in lithium chloride, is 0.23. The molecular weight (light scattering method in dimethyl formamide) is 85,000. The percent conversion to polymer is 9.0%.

*Example 3*

Following the technique set forth in Example 1 above, 1.95 parts of tributylvinylphosphonium bromide, dissolved in 6.5 parts of deionized water, are added to a suitable reaction vessel and irradiated at 60° C. for 4 hours at 0.5 mrad./hr. dosage. The resultant polymer is isolated by dialyzing in deionized water for 24 hours, stripping off the water, and extracting 3 times with hot dioxane. After drying in a vacuum at 50° C. for 2 hours, 1.88 parts of a white, somewhat transparent, solid having an intrinsic viscosity, at 30° C. in 0.3 molar aqueous lithium bromide, of 0.464, is recovered. The polymer has a molecular weight of 145,000 and is somewhat tacky. Upon heating on a Fischer-Johns melting point apparatus, the polymer gradually softens and is fluid at about 80° C. The polymer is thermally stable, having a $T_{10}^{air}$ of 402° C. The $T_{10}$ temperature is the temperature at which 10% of the weight of the polymer is lost upon heating at a rate of 10° C. per minute.

*Example 4*

To a solution of 8.0 parts of tributylvinylphosphonium bromide and 152 parts of acrylonitrile in 7.5 parts of a 36.5% HCl solution and 1400 parts of deionized water, in a suitable reaction vessel, is added a solution of 2.3 parts of sodium chlorate and 8.18 parts of sodium sulfite in 150 parts of water. The temperature of the vessel is maintained at 40° C. for 4 hours while continuously passing nitrogen gas over the system. The resultant copolymer, containing 0.2% phosphorus and having a molecular weight of 123,000, is recovered from the reaction mixture, in the form of a white powder, by filtration.

*Example 5*

A solution of 1.0 part of tributylvinylphosphonium bromide and 0.0048 part of ditertiarybutyl peroxide in 2 parts of chlorobenzene is added to a suitable reaction vessel, degassed, sealed and heated for 124.5 hours at 130° C. The resultant polymer is recovered, in a yield of 50%, by filtration. The polymer has an intrinsic viscosity of 0.25 in water containing 0.3 molar lithium bromide, at 30° C., and has a molecular weight of 100,000.

*Example 6*

A solution of 2.0 parts of tributylvinylphosphonium bromide and 0.0107 part of azobisisobutyronitrile, in 6 parts of chlorobenzene, is added to a suitable reaction vessel, degassed, sealed and heated for one week at 60° C. A yield of 92% of homopolymer is recovered. The intrinsic viscosity of the polymer, at 30° C. in water containing 0.3 molar lithium bromide, is 0.23; molecular weight: 85,000.

*Example 7*

Following the procedure of Example 6, except that 0.015 part of azobiscyclohexanenitrile is used as catalyst, 79% of polymer is recovered having a molecular weight of 110,000.

*Example 8*

A solution of 0.50 part of tributylvinylphosphonium chloride and 0.010 part of potassium persulfate, in a suitable reaction vessel is degassed, sealed and heated for 72 hours at 80° C. A 100% yield of polymer is obtained by filtration, having an intrinsic viscosity, measured as above, of 0.75 and a molecular weight of 675,000.

*Example 9*

Following the procedure of Example 6, a homopolymer of tributylvinylphosphonium iodide is recovered in a yield of 90%. The polymer has an intrinsic viscosity, as measured above, of 0.24 and a molecular weight of 92,000.

*Example 10*

Following the procedure of Example 1, a homopolymer of tributylvinylphosphonium fluoride is recovered in a yield of 65%. The polymer has a molecular weight of 500,000.

*Example 11*

To a solution of 2.3 parts of tributylvinylphosphonium chloride and 1.51 parts of vinyl acetate in 3 parts of $CH_3CN$, in a suitable reaction vessel, is added 0.0411 part of azobisisobutyronitrile. The resultant solution is heated at 60° C. for 11 hours. 1.83 parts of copolymer are recovered. The polymer contains 7.74% phosphorus.

*Example 12*

Following the procedure of Example 11, except that 2.32 parts of tributylvinylphosphonium iodide and 0.926 part of acrylonitrile is employed and the reaction is conducted for 7 hours, 0.48 part of copolymer, containing 2.44% phosphorus, is recovered.

*Example 13*

Again following the procedure of Example 11, except that 2.32 parts of tributylvinylphosphonium bromide and 1.76 parts of methyl methacrylate are heated for 4 hours, 1.10 parts of copolymer, containing 0.23% phosphorus, are recovered.

*Example 14*

Again following the procedure of Example 11, except that 2.32 parts of tributylvinylphosphonium fluoride and 1.82 parts of styrene are heated for 18.5 hours, 1.65 parts of copolymer, containing 3.5% phosphorus, are recovered.

*Examples 15–17*

Following the procedure of Example 1, except that equivalent amounts of tricyclohexylvinylphosphonium bromide, triethylvinylphosphonium bromide and dimethylphenylvinylphosphonium bromide are employed, no polymer is recovered in each instance. These examples show the unexpected property of the tributylphosphonium compounds set forth in Examples 1 to 14 above.

We claim:
1. A normally solid homopolymer of a compound having the formula

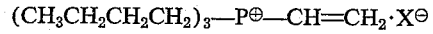

$(CH_3CH_2CH_2CH_2)_3-P^{\oplus}-CH=CH_2 \cdot X^{\ominus}$ wherein X is selected from the group consisting of fluorine, chlorine, bromine and iodine radicals.
2. A normally solid homopolymer of tributylvinylphosphonium fluoride.
3. A normally solid homopolymer of tributylvinylphosphonium bromide.
4. A normally solid homopolymer of tributylvinylphosphonium chloride.
5. A normaly solid homopolymer of tributylvinylphosphonium iodide.
6. A normally solid polymer of a compound having the formula

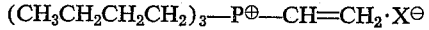

$(CH_3CH_2CH_2CH_2)_3-P^{\oplus}-CH=CH_2 \cdot X^{\ominus}$ wherein X is selected from the group consisting of fluorine, chlorine, bromine and iodine radicals and 5.0% to about 99.5% by weight, of at least one monoethylenically unsaturated compound copolymerizable therewith.
7. A normally solid polymer of tributylvinylphosphonium fluoride and 5.0% to about 99.5%, by weight, of at least one monoethylenically unsaturated compound copolymerizable therewith.

8. A normally solid polymer of tributylvinylphosphonium bromide and 5.0% to about 99.5%, by weight, of at least one monoethylenically unsaturated compound copolymerizable therewith.

9. A normally solid polymer of tributylvinylphosphonium chloride and 5.0% to about 99.5%, by weight, of at least one monoethylenically unsaturated compound copolymerizable therewith.

10. A normally solid polymer of tributylvinylphosphonium iodide and 5.0% to about 99.5%, by weight, of at least one monoethylenically unsaturated compound copolymerizable therewith.

11. A normally solid copolymer according to claim 6 wherein the monoethylenically unsaturated compound is acrylonitrile.

12. A normally solid copolymer according to claim 6 wherein the monoethylenically unsaturated compound is methyl methacrylate.

References Cited by the Examiner

UNITED STATES PATENTS 3,168,502  2/1965  Sexsmith et al. _____ 260—88.1

FOREIGN PATENTS 629,044  10/1961  Canada.

JOSEPH L. SCHOFER, *Primary Examiner.*

DONALD E. CZAJA, *Examiner.*

H. WONG, *Assistant Examiner.*